(12) United States Patent
Erfourth

(10) Patent No.: US 7,382,072 B2
(45) Date of Patent: Jun. 3, 2008

(54) GENERATOR

(75) Inventor: Eric J. Erfourth, Minneapolis, MN (US)

(73) Assignee: Erfurt & Company, Minneapolis, MN (US)

( * ) Notice: Subject to any disclaimer, the term of this patent is extended or adjusted under 35 U.S.C. 154(b) by 0 days.

(21) Appl. No.: 10/672,313

(22) Filed: Sep. 26, 2003

(65) Prior Publication Data

US 2004/0232792 A1 Nov. 25, 2004

Related U.S. Application Data

(60) Provisional application No. 60/472,637, filed on May 22, 2003.

(51) Int. Cl.
*H02K 21/12* (2006.01)
*H02K 1/28* (2006.01)
*H02K 55/06* (2006.01)

(52) U.S. Cl. ............................ 310/156.09; 310/156.32; 310/156.39; 310/156.43; 310/158; 310/178; 505/166; 505/876

(58) Field of Classification Search ........... 310/156.01, 310/156.08, 156.09, 156.32, 156.38, 156.39, 310/156.43, 156.45, 158, 156.339, 178; 505/166, 505/876
See application file for complete search history.

(56) References Cited

U.S. PATENT DOCUMENTS 428,057 A 5/1890 Tesla
(Continued)

FOREIGN PATENT DOCUMENTS

EP 429729 A1 * 6/1991

OTHER PUBLICATIONS

Unknown author, Moving Magnet Generator, University of Michigan Physics Department, 1 page, Mar. 14, 2001.*

(Continued)

*Primary Examiner*—Karl Tamai
*Assistant Examiner*—David W. Scheuermann
(74) *Attorney, Agent, or Firm*—Leffert Jay & Polglaze, P.A.

(57) ABSTRACT

An efficient and reconfigurable permanent magnet generator that comprises a permanent magnet subassembly and at least one exciter is disclosed. The permanent magnet generator may comprise a mainframe comprising at least one exciter, and a permanent magnet subassembly comprising a plurality of magnets that are arranged to form at least one air gap between facing magnetic poles in which the at least one exciter resides and that are reconfigurable for alternating current or direct current operation by inversion of respective magnetic poles. The at least one exciter may comprise a plurality of alternating layers of a first material and a second material, where the first material may comprise a superconductive material and the second material may comprise a non-superconductive material, and wherein the layers of the superconductive material are thin relative to the thickness of the layers of the non-superconductive material. A method for generating electric energy using a reconfigurable permanent magnet generator is also disclosed. The method comprises selecting an alternating current or a direct current generation mode; configuring at least one reconfigurable magnet to correspond with the selected generation mode; disposing at least one exciter in an air gap defined by the at least one reconfigurable magnet; and
rotating the at least one reconfigurable magnet relative to the at least one exciter. The disclosed generator may thus produce either alternating current (AC) or direct current (DC) using alternative configurations of the same mechanical components.

39 Claims, 17 Drawing Sheets

U.S. PATENT DOCUMENTS

| | | |
|---|---|---|
| 433,702 A | 8/1890 | Tesla |
| 447,921 A | 3/1891 | Tesla |
| 511,916 A | 1/1894 | Tesla |
| 1,061,206 A | 5/1913 | Tesla |
| 2,806,159 A | 9/1957 | Sheldon |
| 3,493,800 A | 2/1970 | Barrett |
| 3,538,364 A | 11/1970 | Favereau |
| 4,827,171 A | 5/1989 | Bertram et al. |
| 5,117,142 A | 5/1992 | von Zweygbergk |
| 5,227,702 A * | 7/1993 | Nahirney .................. 318/138 |
| 5,325,002 A | 6/1994 | Rabinowitz et al. |
| 5,350,958 A | 9/1994 | Ohnishi |
| 5,554,903 A | 9/1996 | Takara |
| 5,608,281 A | 3/1997 | Gerling et al. |
| 5,625,241 A | 4/1997 | Ewing et al. |
| 5,650,680 A | 7/1997 | Chula |
| 5,696,419 A | 12/1997 | Rakestraw et al. |
| 5,719,458 A | 2/1998 | Kawai |
| 5,841,211 A | 11/1998 | Boyes |
| 5,892,311 A | 4/1999 | Hayasaka |
| 5,917,261 A | 6/1999 | Kawai |
| 5,925,958 A | 7/1999 | Piere |
| 5,955,809 A | 9/1999 | Shah |
| 6,002,193 A | 12/1999 | Canini et al. |
| 6,037,696 A | 3/2000 | Sromin et al. |
| 6,097,118 A | 8/2000 | Hull |
| 6,100,620 A | 8/2000 | Radovsky |
| 6,127,764 A | 10/2000 | Torok |
| 6,147,415 A | 11/2000 | Fukada |
| 6,169,352 B1 | 1/2001 | Hull |
| 6,172,438 B1 | 1/2001 | Sakamoto |
| 6,462,449 B1 | 10/2002 | Lucidarme et al. |

OTHER PUBLICATIONS

"Superconducting $YBa_2CU_3O_{7-x}$ Films on Copper Substrates", Anqui Wu, Richard T. Williams, C. Thomas Law, G.E. Matthews, Jr.; Howard W. Shields; Tilman Prater; Robert D. Eyster; George B. Cvijanovich; AMP Journal of Technology, vol. 1, Nov. 1991.

* cited by examiner

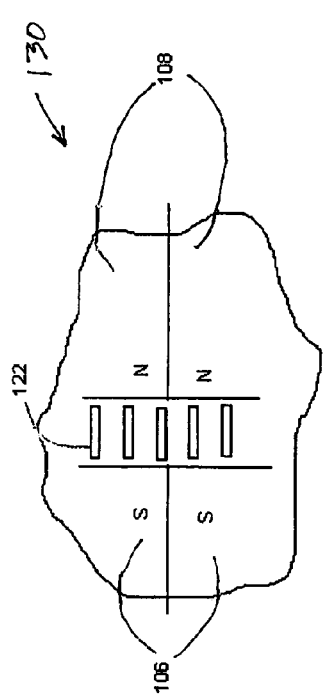
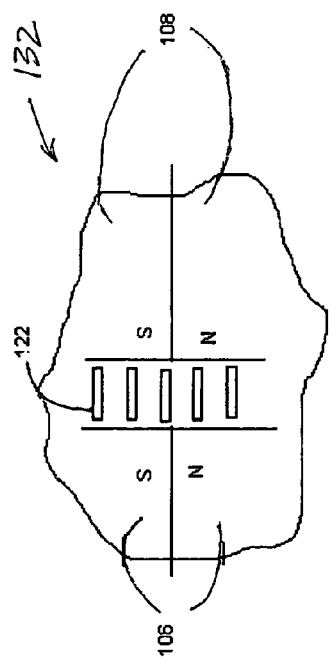
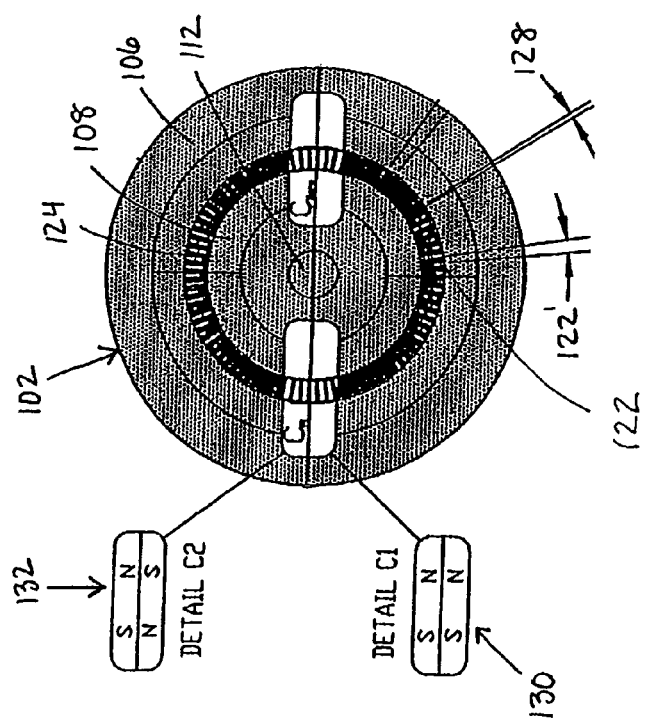
FIG. 8

GENERATOR

RELATED APPLICATION

The present application claims the benefit of U.S. Provisional Application No. 60/472,637 filed May 22, 2003, which is incorporated herein in its entirety by reference.

FIELD OF THE INVENTION

The present invention relates generally to motors and generators and more particularly to a permanent magnet alternating current and direct current electric power generator and method for generating alternating current and direct current electric power.

BACKGROUND OF THE INVENTION

In simple terms, a generator is a device for converting mechanical energy into electrical energy and works by electromagnetic induction. A power source drives a coil winding, causing it to rotate between the poles of a permanent magnet or electromagnet. As the coil winding spins and cuts through the lines of force between the poles of the magnet, potential energy and electric current is generated and flows through the coil winding. The electric current that is generated may be either direct current (DC) or alternating current (AC). In AC generation, a sinusoidal output waveform is produced; no energy is induced as the coil winding rotates parallel to the magnetic flux lines, while maximum power is achieved when the coil winding is rotating tangential to the magnetic flux lines.

The first electric generators, or dynamos, were modeled and built in the 1830s. By the end of the nineteenth century, significant advances were being made in the field of electrical generation, particularly by Nikola Tesla. In 1890, Tesla disclosed a pyromagneto-electric generator in U.S. Pat. No. 428,057, in which he recognized that the magnetic properties of iron and other magnetic substances may be compromised by raising the material to a certain temperature and restored by again lowering the temperature. Also in 1890, Tesla disclosed an electrical transformer or induction device in U.S. Pat. No. 433,702.

Alternating current generators in use at the time typically provided from one to three hundred alterations of current per second. It was soon recognized that higher rates of alteration would be an advantage. Producing higher rates of alteration with generator designs at the time, however, was difficult and resulted in decreased efficiency, primarily due to high magnetic leakage, and improved generator designs were sought. In U.S. Pat. No. 447,921, Tesla discloses a field-magnet core made up of two independent parts formed with grooves for the reception of one or more energizing coils. The energizing coils are completely surrounded by the iron core, except on one side, where there is a narrow opening between the polar faces of the core, and the polar faces of the core are formed with many projections or serrations. This field-magnet design produced less magnetic leakage but still did not operate at a desired level of efficiency.

In 1894, Tesla disclosed an electric generator in U.S. Pat. No. 511,916. This generator was capable of continued production of electric currents of constant period by imparting the movements of a piston to a core or coil in a magnetic field.

By the twentieth century, more reliable turbines were in use, capable of providing 50-60 Hertz power with 3000-3600 alternations of current per second. In U.S. Pat. No. 1,061,206, Tesla discloses a turbine that improves the use of fluids as motive agents by causing a propelling fluid to move in natural paths or stream lines of least resistance, avoiding losses due to sudden variations while the fluid is imparting energy. This method, when coupled with power generating equipment, provided a more efficient and reliable means of hydraulic power synthesis.

Another conventional generator example is the Detroit Edison generator. The Detroit Edison generator includes an outer extruded stationary permanent magnet with opposite magnetic poles forming an air gap at the center, with a number of windings rotated within the air gap to induce current in the rotating windings. As with other early generator designs, increased and improved efficiency was sought, often realized by increasing the length of the cylindrical generator.

Generator designs continued to advance in the twentieth century, where improvements made to the above-identified generator designs frequently focused on improving efficiency. U.S. Pat. No. 3,538,364, to Favereau, discloses a rotary electric machine comprising a fixed primary stator in the form of a pair of concentrically arranged inner and outer stator elements having magnetic poles and between which, in an air gap, the secondary cylindrical rotor having a winding thereon is mounted for rotation. The magnetic stator provides a 360-degree air gap between opposite magnetic poles in the inner and outer stator. This arrangement reduced the size of leakage fluxes and reduced the volume of the coils situated around the poles, permitting increases in the working induction in the cylindrical air gap.

More recently, improvements have recognized and addressed optimizing the waveshape of the generator output to maximize generator output and improve efficiency. In U.S. Pat. No. 5,650,680, Chula discloses a permanent magnet generator having a rotor including a plurality of permanent magnets generating an operative magnetic flux field, seeking to create an output voltage signal with reduced harmonic content.

Conventional generator designs typically include contacts, or "brushes," that rotate relative to electrical contacts and provide a circuit for electricity to flow through. Brushes, however, require regular maintenance and replacement as they become worn. Additionally, the electrical resistance of the brushes and the mechanical frictional loss between the brushes and the contacts decrease generator efficiency. These drawbacks were recognized by Rakestraw et al. in U.S. Pat. No. 5,696,419, which discloses an electrical generator with a plurality of C-shaped stator members made of magnetically permeable material. A flat ring-shaped rotor defines a periphery, and a plurality of permanent magnets are positioned around the periphery. The rotor is positioned with the magnets of the rotor disposed in the gap defined by the stator members, so that when the rotor is rotated by a prime mover to move the magnets through the gap, an electrical current is induced in the stator windings.

Others have sought to improve generator efficiency by not only eliminating brushes but also improving per-magnet rotor excitation. In U.S. Pat. No. 6,462,449, Lucidarme et al. disclose a rotating electric machine where the rotor includes a magnetic field core provided with radial teeth, uniformly distributed at its periphery. Annular magnets are arranged on either side of the core axial ends and magnetic end flanges pressing the annular magnets against the core. Magnetic bars link the end between each of the bars and at least the side walls of the core radial teeth defining the spaces. The stator includes a magnetic core, excitation coils arranged on either side of the core, a stator coil wound on the core, and a magnetic ring in contact with the core and provided with radial rims cooperating with the axial rims of the rotor end flanges to form paths for the return flux.

While generator efficiencies have been increased through mechanical and electrical engineering methods as described above, there is still room for significant advancement and improvement. Relatively recent advancements in modern materials science have been applied to generator design and manufacture. For example, superconductive materials have been used in the construction of generator components. These materials provide a reduced resistance to the flow of electricity, and when used in generator components, superconductive materials have been shown to increase overall efficiency on the order of approximately 1%-3% in some applications, a relatively small gain that is quickly appreciated in large-scale generators.

An example of a trapped-field superconducting generator is disclosed in U.S. Pat. No. 5,325,002, to Rabinowitz et al. This motor/generator includes superconductive material in either the stator or the rotor and a magnetic field generator is included in the other of these two members. Induced fields in a torque-shield provide coupling between the stator and the rotor during the start-up phase of the motor/generator, and then a trapped field in the superconductor provides coupling between the stator and rotor thereafter.

U.S. Pat. No. 6,169,352, to Hull, discloses another example of a trapped-field superconducting motor generator. The motor generator includes a high temperature superconductor rotor and an internally disposed coil assembly. The motor generator superconductor rotor is constructed of a plurality of superconductor elements magnetized to produce a dipole field. The coil assembly can be either a conventional conductor or a high temperature superconductor. The superconductor rotor elements include a magnetization direction and c-axis for the crystals of the elements and which is oriented along the magnetization direction.

The above-identified generators are typically bulky and complex. Further, their designs are static, producing a single output and requiring manufacturing retooling to produce an alternate output form. Additionally, even in conventional superconducting generators, increased efficiency is desired, particularly by large-scale generation facilities and public utilities, where a small increase in efficiency can lead to a significant cost savings over time.

Therefore, there is a need for a cost-effective generator that operates with increased efficiency. There is also a need for a generator that is reconfigurable, capable of producing multiple desired outputs from a single tooled design. There is also a need for a generator that is capable of producing outputs over longer periods of time, with greater reliability and reduced maintenance costs. Further, there is a need for a generator that is adaptable to a greater range of inputs, i.e. combustion, nuclear, wind, water, and other renewable energy resources.

SUMMARY OF THE INVENTION

The present invention substantially meets the aforementioned needs of the industry by providing an improved permanent magnet generator that increases efficiency and offers multiple outputs from a single scaleable and reconfigurable design that offers fewer components and improved manufacturability.

The permanent magnet generator may comprise a mainframe comprising at least one exciter, and a permanent magnet subassembly comprising a plurality of magnets that are arranged to form at least one air gap between facing magnetic poles in which the at least one exciter resides and that are reconfigurable for alternating current or direct current operation by inversion of respective magnetic poles. The at least one exciter may comprise a plurality of alternating layers of a first material and a second material, where the first material may comprise a superconductive material and the second material may comprise a non-superconductive material, and wherein the layers of the superconductive material are thin relative to the thickness of the layers of the non-superconductive material.

A method for generating electric energy using a reconfigurable permanent magnet generator is also disclosed. The method comprises selecting an alternating current or a direct current generation mode; configuring at least one reconfigurable magnet to correspond with the selected generation mode; disposing at least one exciter in an air gap defined by the at least one reconfigurable magnet; and rotating the at least one reconfigurable magnet relative to the at least one exciter. The disclosed generator may thus produce either alternating current (AC) or direct current (DC) using alternative configurations of the same mechanical components.

The above summary of the present invention is not intended to describe each illustrated embodiment or every implementation of the present invention. The following figures and detailed description more particularly exemplify the embodiments of the present invention.

BRIEF DESCRIPTION OF THE DRAWINGS

The present invention may be more completely understood in consideration of the following detailed description of various embodiments of the invention in connection with the accompanying drawings, in which:

FIG. 8 is a top cross-sectional diagrammatic of a generator assembly according to an embodiment of the present invention.

FIG. 8a is an enlarged view of detail C1 of FIG. 8.

FIG. 8b is an enlarged view of detail C2 of FIG. 8.

Figure 1:
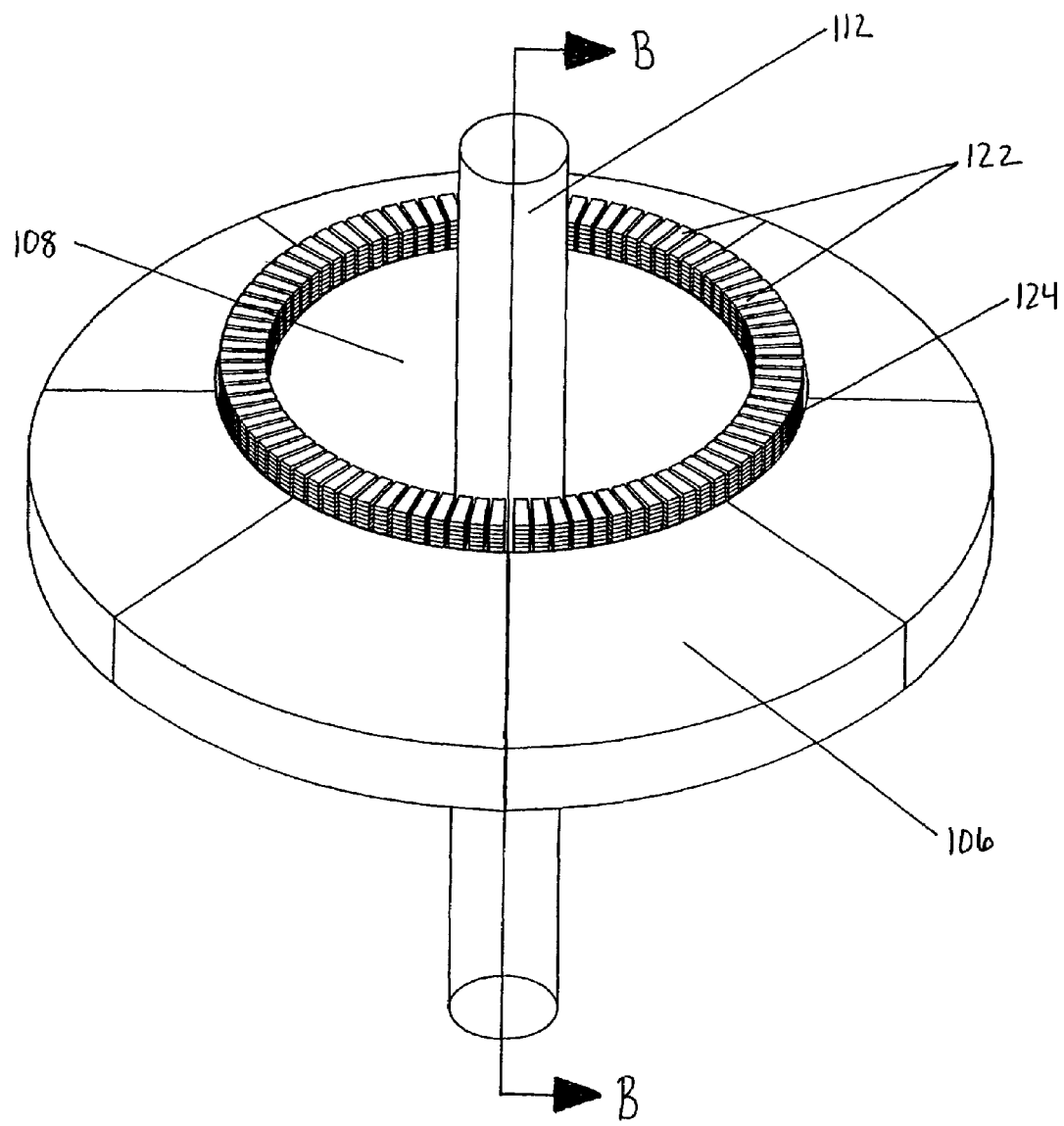
FIG. 1 is a perspective view of a generator assembly according to an embodiment of the present invention.
Figure 2:
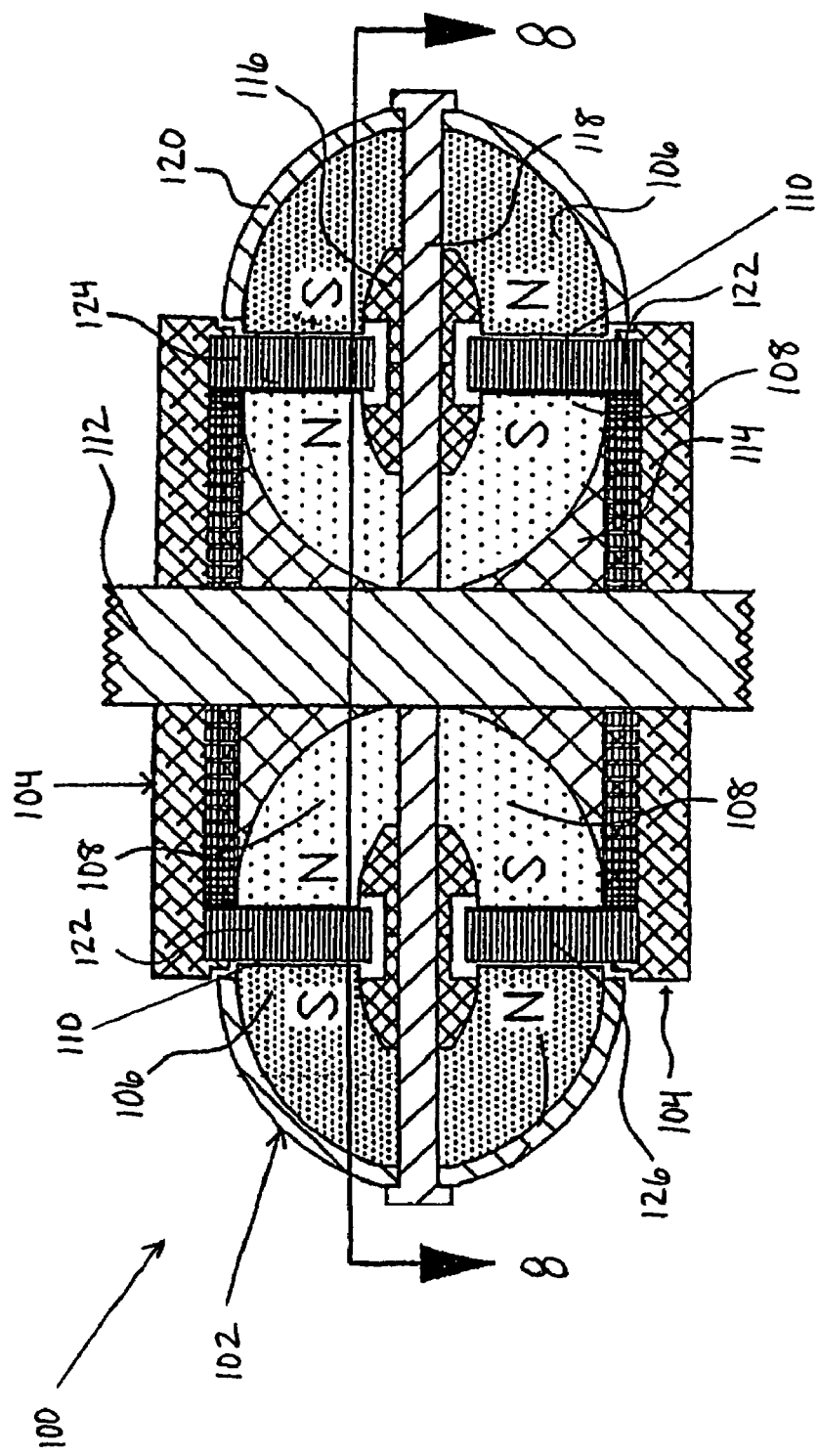
FIG. 2 is a cross-sectional view of FIG. 8 taken along line 8-8 according to an embodiment of the present invention.
Figure 3:
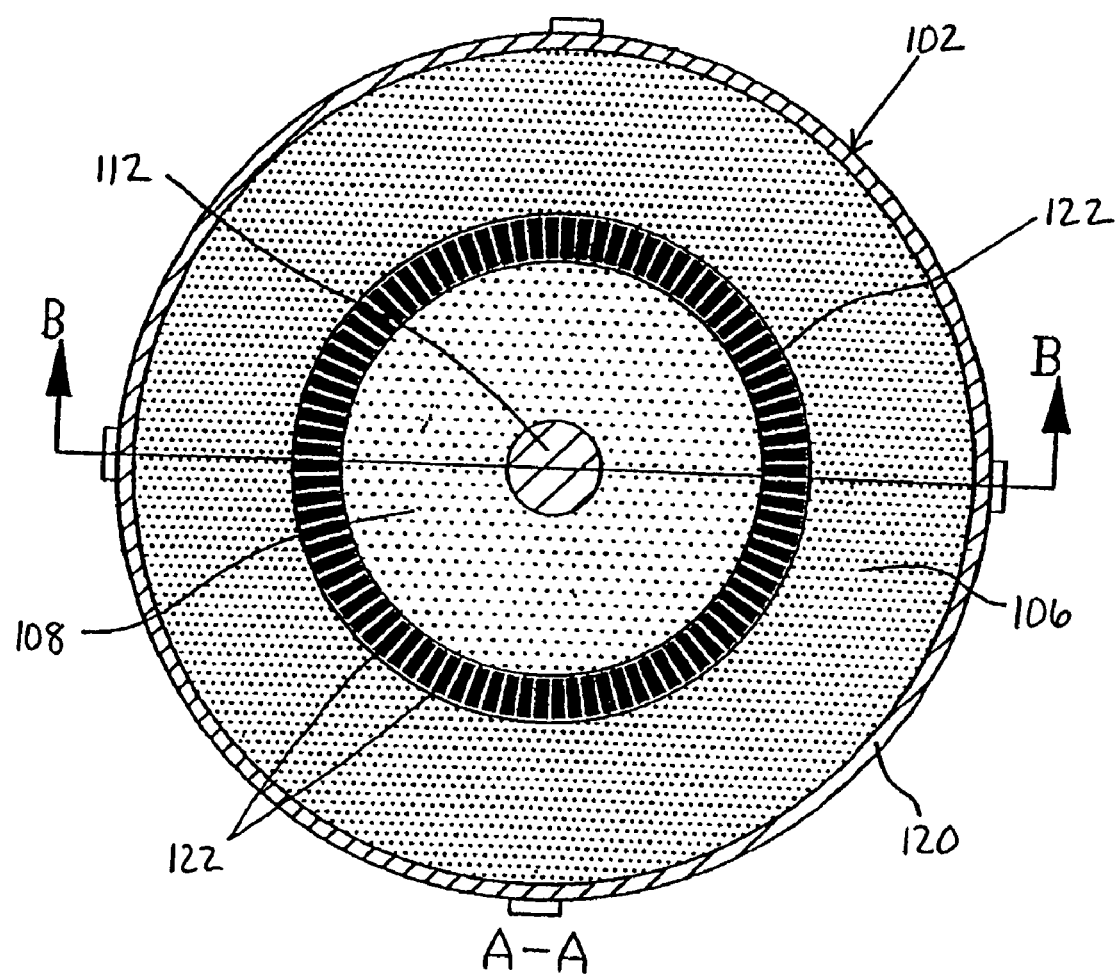
FIG. 3 is a cross-sectional view of FIG. 2 taken along line A-A according to an embodiment of the present invention.

While the present invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE DRAWINGS

The present invention can be more readily understood by reference to FIGS. 1-17 and the following description. While the present invention is not necessarily limited to such applications, the invention will be better appreciated using a discussion of example embodiments in such a specific context.

Particular embodiments of the permanent magnet generator of the present invention may be reconfigured for use in varying applications and may operate with increased efficiency. In one preferred embodiment, the permanent magnet generator of the present invention includes a magnet assembly that comprises complimentary external and internal permanent magnets. In another preferred embodiment, the permanent magnet generator comprises a simplified design that includes a unitary magnet assembly and reduces the overall number of components.

The generator of the present invention may produce either AC or DC using alternative configurations of the same mechanical components. In another embodiment, the generator of the present invention increases efficiency by utilizing superconductive materials in the exciters. Thus, various embodiments of the generator of the present invention may be used in many different and varying applications, and may provide a cost savings that is achieved through a reduction in components and tooling. One embodiment of the generator of the present invention also provides a versatile and reconfigurable design and is adaptable to the application of advancements in modern materials science.

In one embodiment, the generator of the present invention generally comprises at least one exciter coupled to a mainframe, and a permanent magnet subassembly formed so that opposing magnetic poles form at least one air gap in which the at least one exciter resides. Relative rotational movement between the permanent magnet assembly and the at least one exciter, such as when the permanent magnet assembly is rotated while the exciter remains stationary, or vice-versa, induces current flow through the at least one exciter.

Referring now to FIGS. 1-6, the generator assembly 100 of the present invention comprises a permanent magnet subassembly 102 and a mainframe 104. The permanent magnet subassembly 102 comprises a U-shaped external magnet 106 with magnetic poles facing inwardly and an internal magnet 108 having magnetic poles facing outwardly toward the inward-facing magnetic poles of the external magnet 106. The magnets 106 and 108 are preferably iron ferrite magnets, which is a less expensive and thus more cost-effective material. The magnets 106 and 108 may also be rare earth magnets, ceramic rare earth magnets, or other suitable magnet materials known to those of skill in the art.

A preferred embodiment of the permanent magnet subassembly 102 further comprises a drive shaft 112, a wedge lock 114, an arch lock 116, a connecting arm 118, and a housing 120. The magnets 106 and 108 abut the connecting arm 118 and are held in place by the wedge lock 114, which is coupled to the drive shaft 112, and the arch lock 116. The external magnet 106 is enclosed by the housing 120, where the housing 120 is aluminum or an alternate light-weight material.

Figure 5:
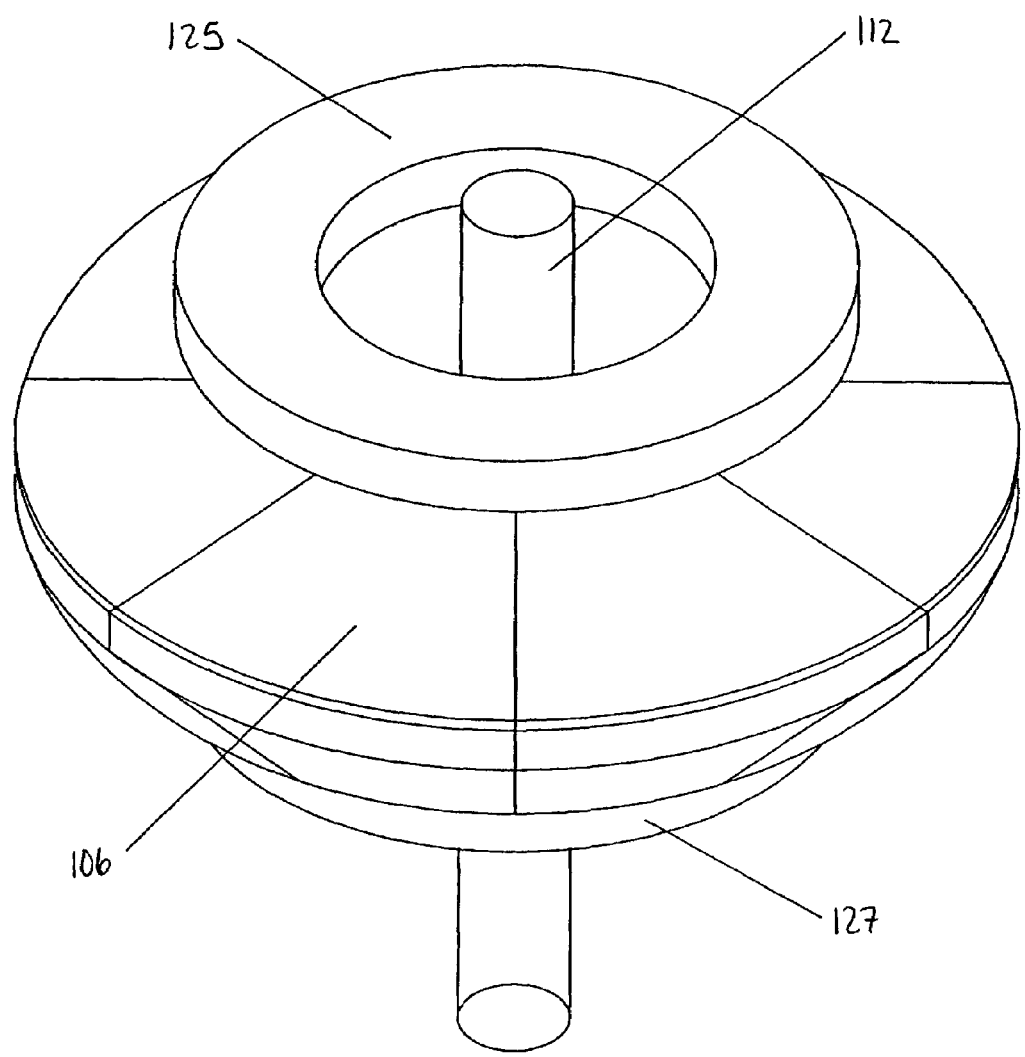
FIG. 5 is a perspective view of a generator assembly according to an embodiment of the present invention.
Figure 6:
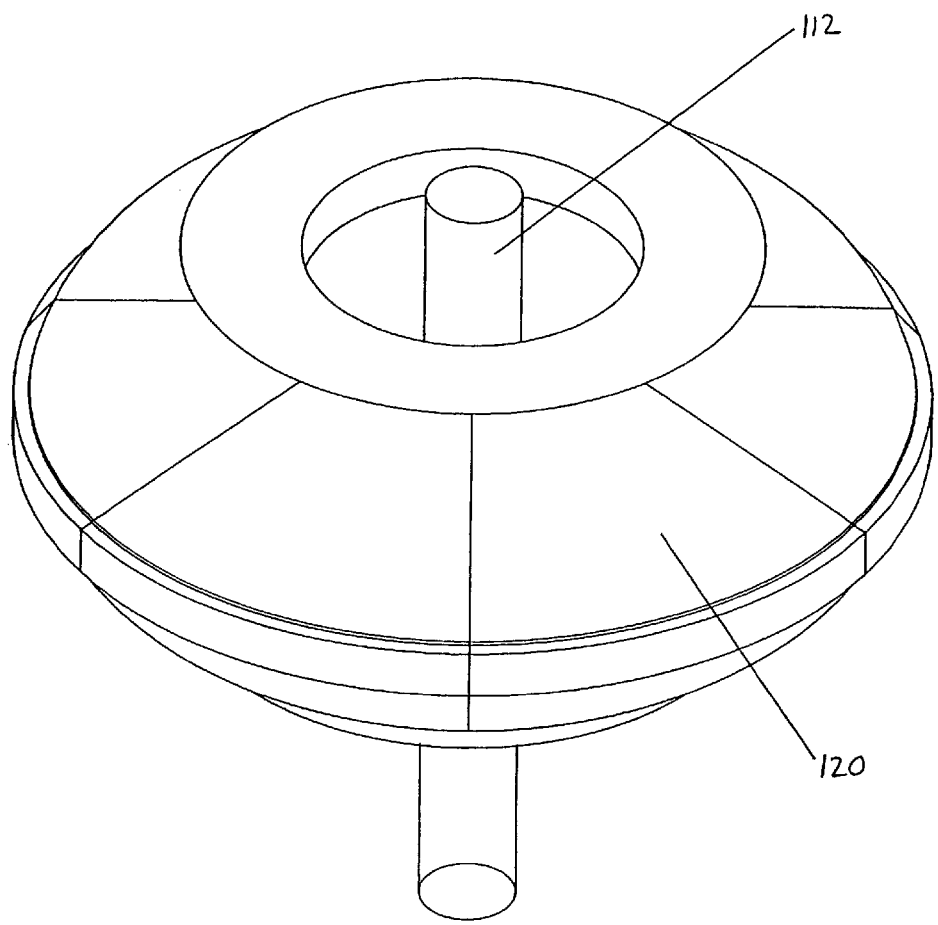
FIG. 6 is a perspective view of a generator assembly according to an embodiment of the present invention.

One embodiment of the mainframe 104 further comprises a plurality of exciters 122 assembled in a first exciter ring 124 and a second exciter ring 126 (see FIG. 5). Each exciter ring 124 and 126 is enclosed in an exciter housing ring 125 and 127. The mainframe 104 may be copper or an alternate conductive material known to those having skill in the art. In one embodiment, the mainframe 104 may further comprise a coolant, for example liquid nitrogen or liquid helium, to regulate the temperature of the exciter rings 124 and 126.

Figure 7:
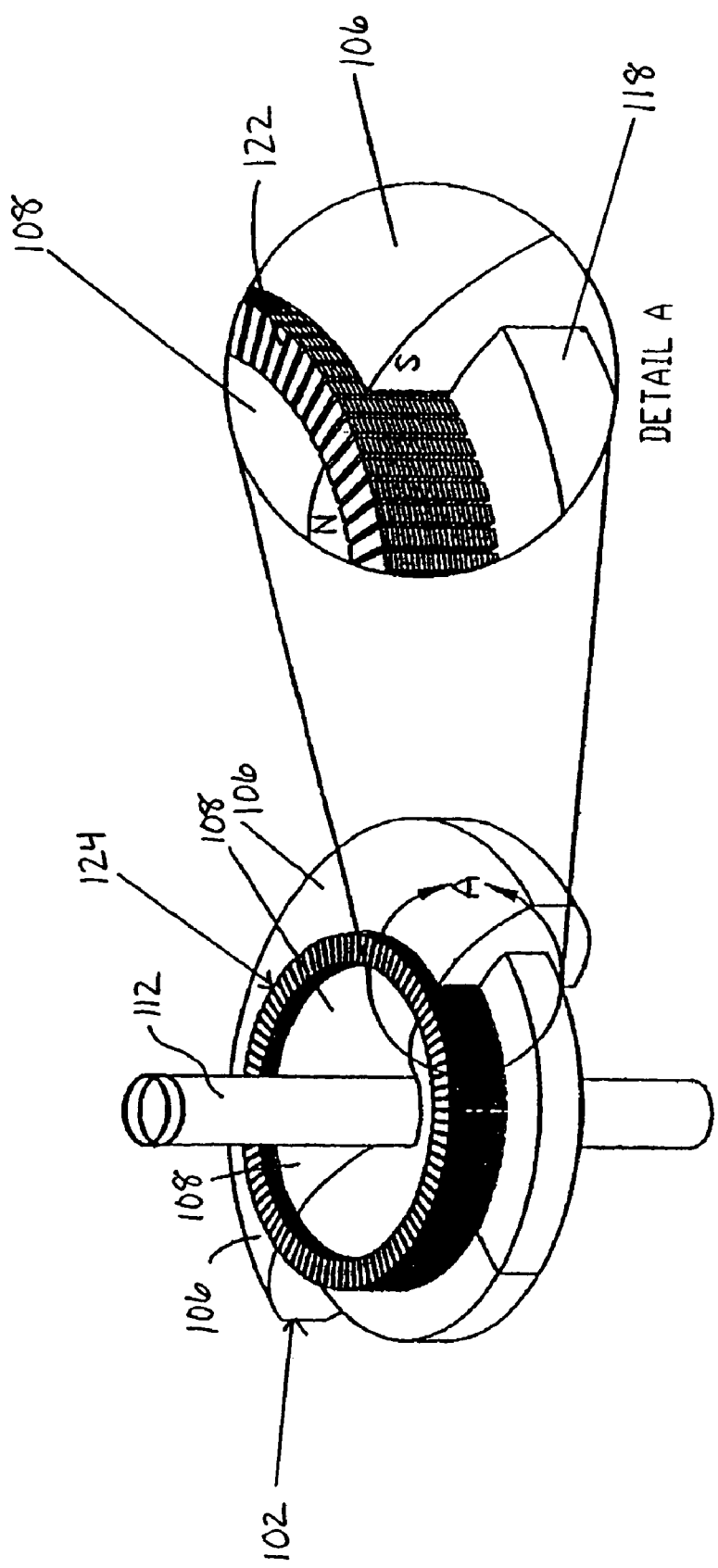
FIG. 7 is a detail view of a generator assembly according to an embodiment of the present invention.

Referring now to the particular embodiment of FIGS. 7 and 8, each of the exciter rings 124 and 126 (not visible; see FIG. 4) comprises a plurality of individual exciters 122 (also seen in FIGS. 8a and 8b). In one embodiment, 90 single-channel exciters 122 are configured side by side in a 360-degree ring 124 and 126, with a separation 128 between each individual exciter 122. In this embodiment, each of the individual exciters 122 occupies about three degrees of the ring 124 and 126 and each separation 128 between individual exciters 122 is about one degree, forming a complete 360-degree ring 124 and 126. Thus, there are a total of 180 individual exciters 122 in the generator assembly, with the first exciter ring 124 comprising 90 individual exciters 122 and the second exciter ring 126 comprising 90 individual exciters 122. One embodiment of an angular span 122' of an exciter 122 is shown in FIG. 8.

In an alternative embodiment, each of the two rings 124 and 126 comprises 120 individual exciters 122 configured side by side in a 360-degree ring 124 and 126. In this embodiment, each individual exciter 122 occupies about two degrees of the 360-degree ring 124 and 126, with a separation 128 of about one degree between each individual exciter 122. Utilizing multiple individual exciters 122 rather than a solid core in particular embodiments of the generator assembly 100 of the present invention increases the available surface area over which electrons may flow and in turn increases overall efficiency.

Referring now primarily to the particular embodiment of FIG. 8, each magnetic pole of the internal magnet 108 faces the opposite magnetic pole of the external magnet 106 with an air gap between each of the two sets of magnetic poles, one air gap for each of the two rings of exciters 124 and 126. In one embodiment, the permanent magnet subassembly 102 may be configured to operate as a variable speed DC generator. In other embodiments, the permanent magnet subassembly 102 may be configured to operate as a 900-3600 rotations per minute (RPM) AC generator. These reconfigurations are accomplished without a change in tooling to manufacture the components of the generator of the present invention and presents a significant cost savings in particular embodiments of the generator assembly 100.

In one preferred embodiment, the internal magnet 108 and external magnet 106 each comprise two segments and are assembled in a DC excitation configuration 130. The four segments of the magnets 108 and 106 are assembled such that current induced in each exciter 122 is in the same direction for the entire 360 degrees of rotation of the permanent magnet subassembly 102. The internal and external magnets 108 and 106 are assembled such that the magnetic poles of abutting segments are matched and the same magnetic poles of each of the two internal magnet 108 pieces and each of the two external magnet 106 pieces faces the same ring of exciters 124 or 126.

In alternative preferred embodiments, the internal magnet 108 and external magnet 106 each comprise two segments and are assembled in an AC excitation configuration 132. In this configuration 132, one of the two segments of the internal magnet 108 is of the opposite polarity of the other abutting segment of the internal magnet 108. The corresponding piece of the external magnet 106 is also of the opposite polarity, such that the abutting magnetic poles are mismatched and the current in each exciter 122 is induced in one direction for 180 degrees of rotation and in the opposite direction for the next 180 degrees of rotation, operably producing 3000-3600 RPM at 50-60 Hertz. In alternative embodiments, the internal magnet 108 and the external magnet 106 may comprise more than two pieces and produce additional AC outputs, including 1500-1800 RPM with the current induction direction alternating each ninety degrees of rotation and 750-900 RPM with current induction direction alternating each forty-five degrees of rotation, requiring lower input speeds for the generator to provide adapted 50-60 Hz operation. Thus, in one embodiment, the generator of the present invention may be assembled in multiple configurations and generate either AC or DC by simply reconfiguring existing magnet components.

Figures 9A, 9B:
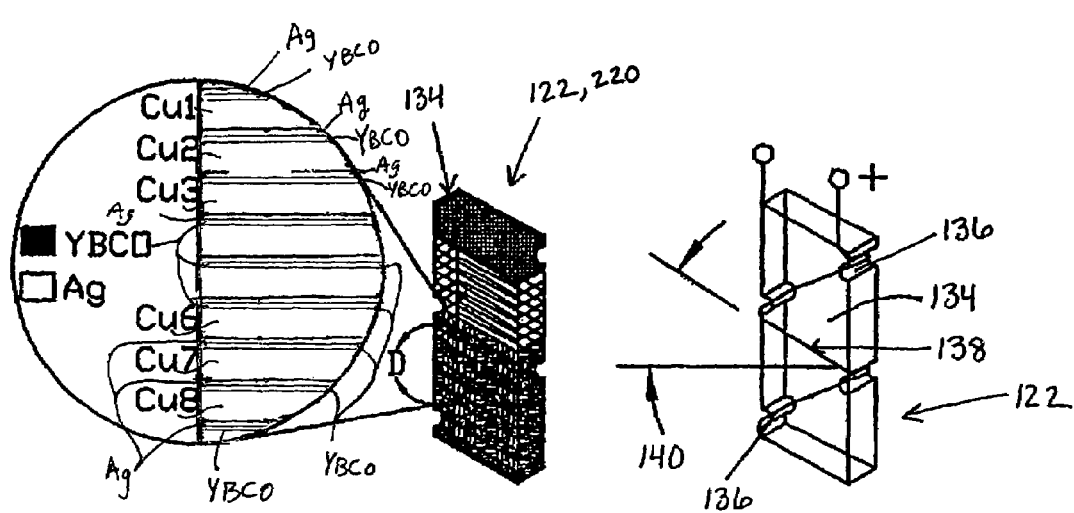
FIG. 9A is a detail view of an exciter according to an embodiment of the present invention.
FIG. 9B is a perspective view of the exciter of FIG. 9A according to an embodiment of the present invention.
Figure 10:
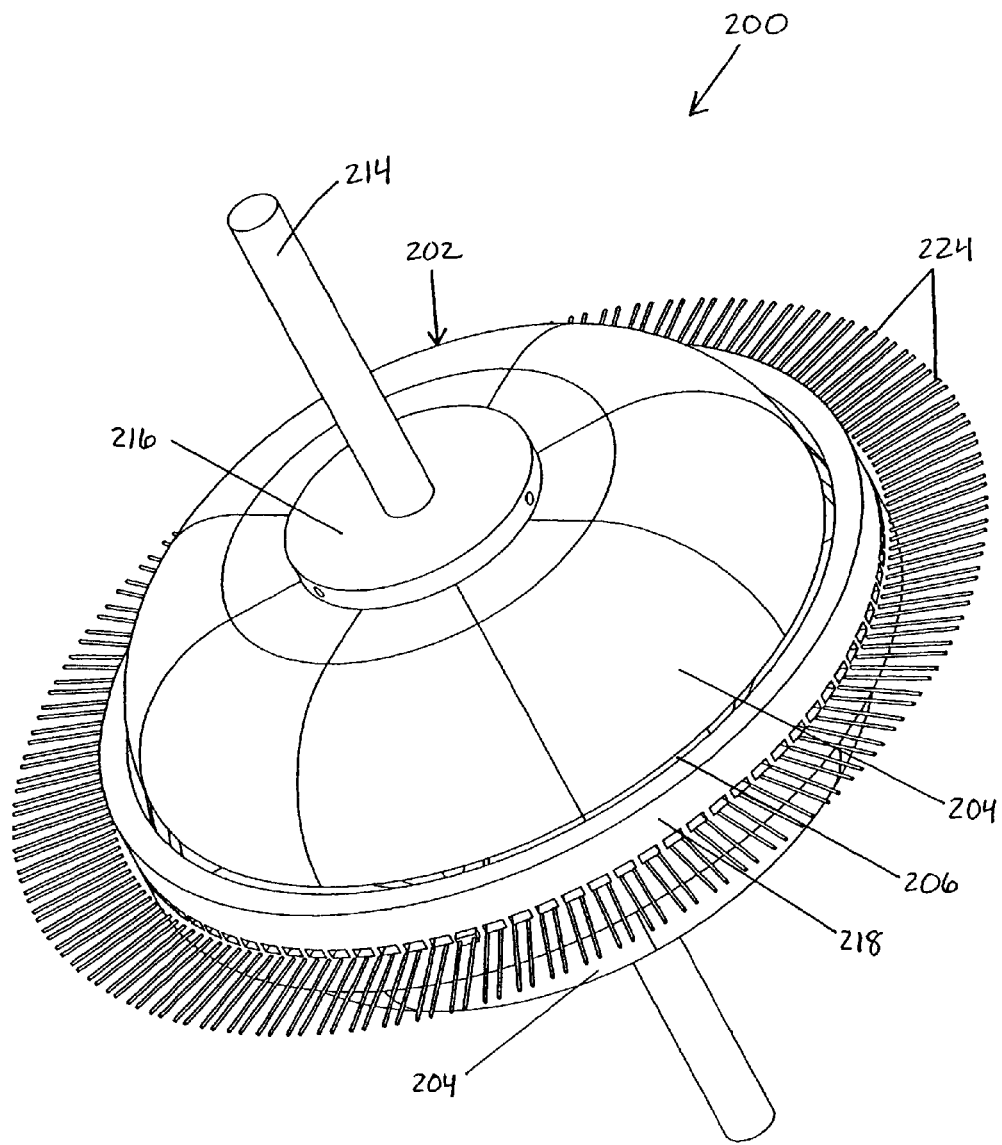
FIG. 10 is a perspective view of a generator assembly according to an embodiment of the present invention.
Figure 11:
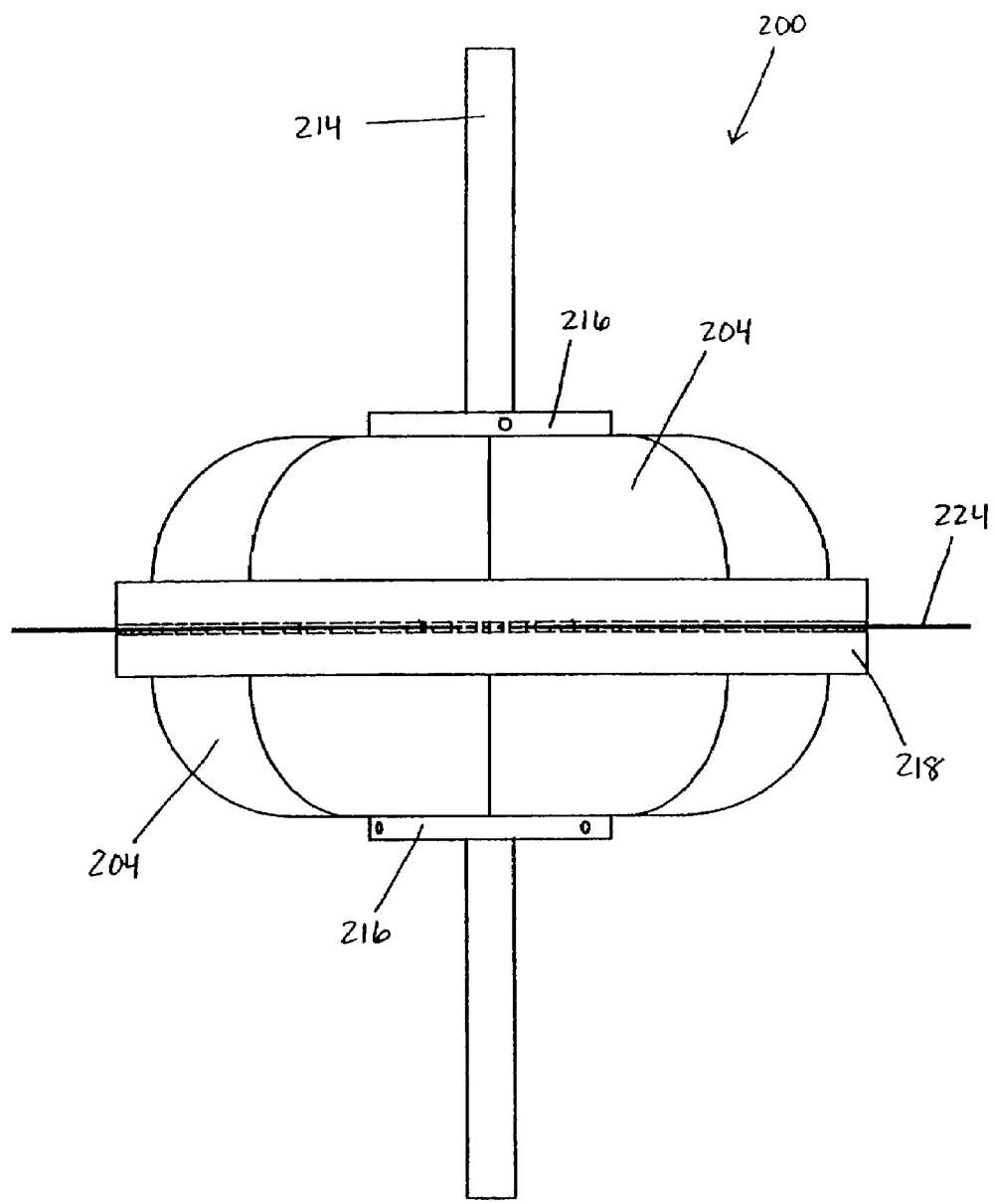
FIG. 11 is a side view of FIG. 10 according to an embodiment of the present invention.
Figure 12:
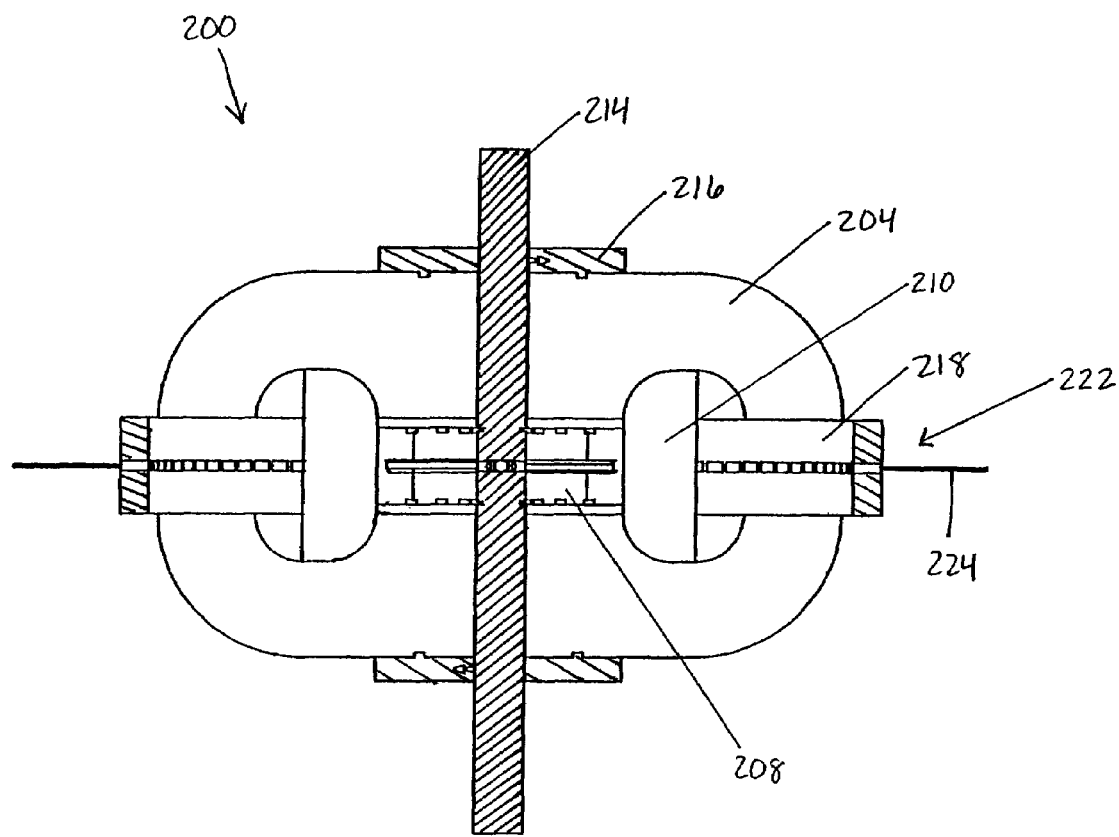
FIG. 12 is a cross-sectional view of FIG. 11 according to an embodiment of the present invention.
Figure 13:
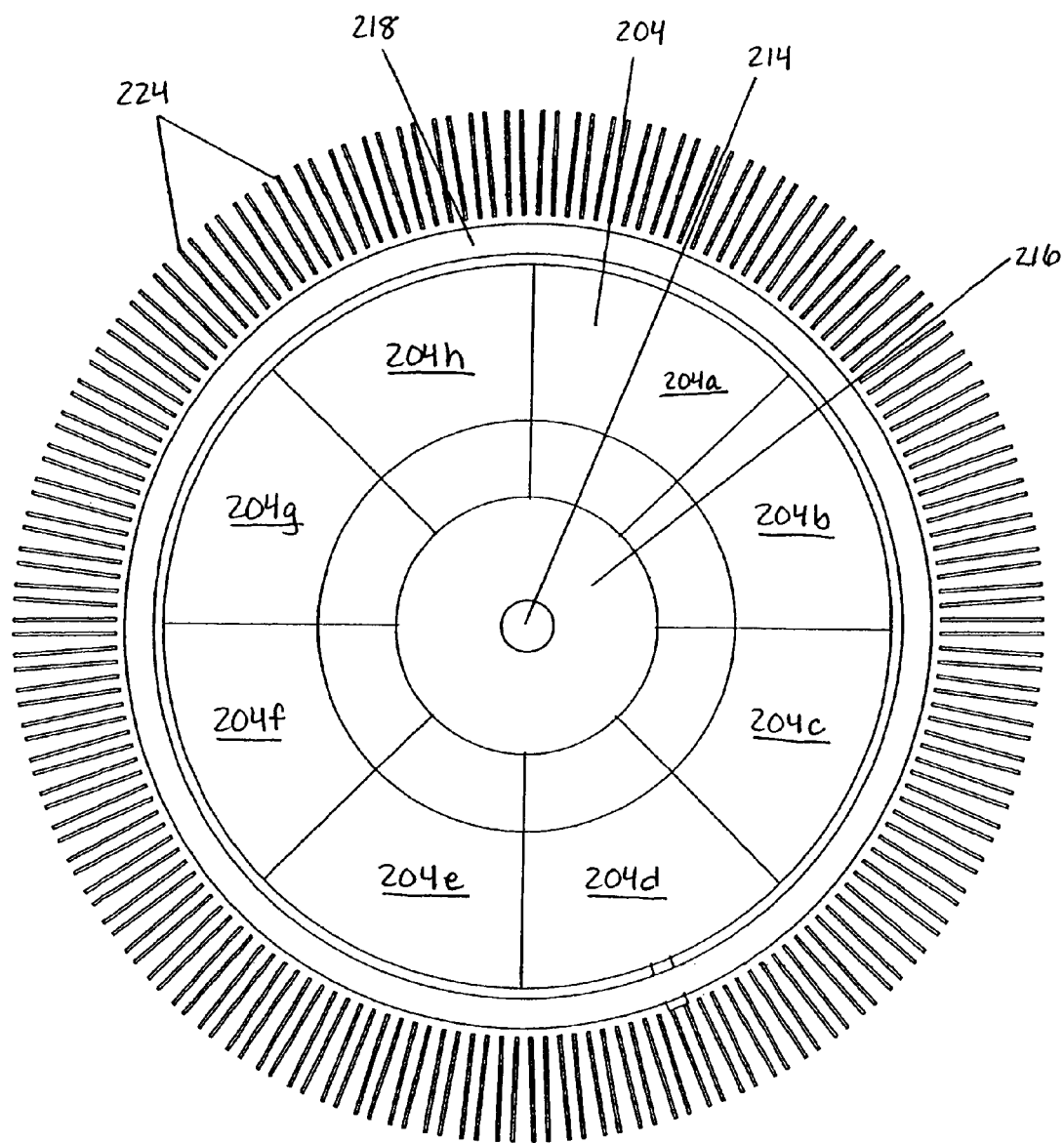
FIG. 13 is a top view of FIG. 10 according to an embodiment of the present invention.
Figure 14:
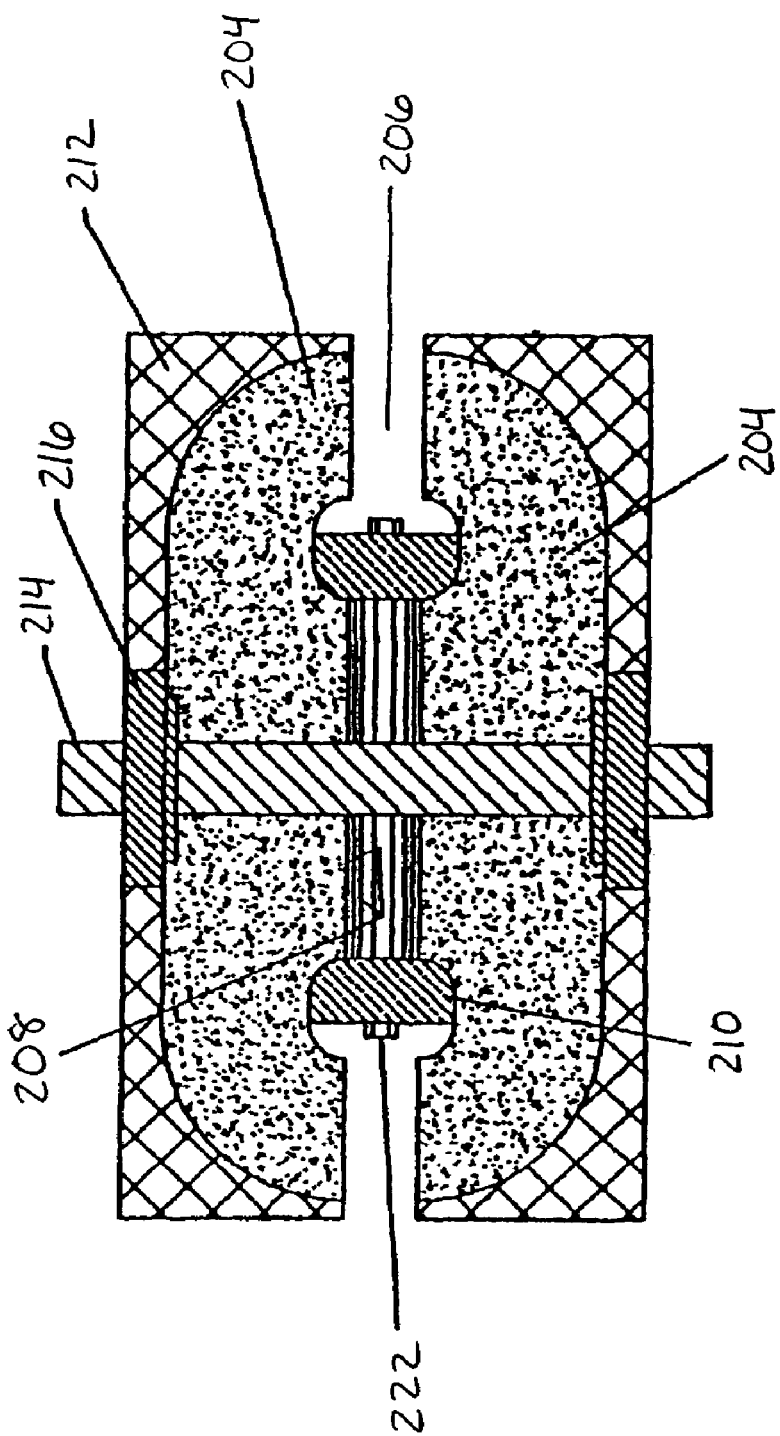
FIG. 14 is a cross-sectional view of a generator assembly according to an embodiment of the present invention.
Figure 15:
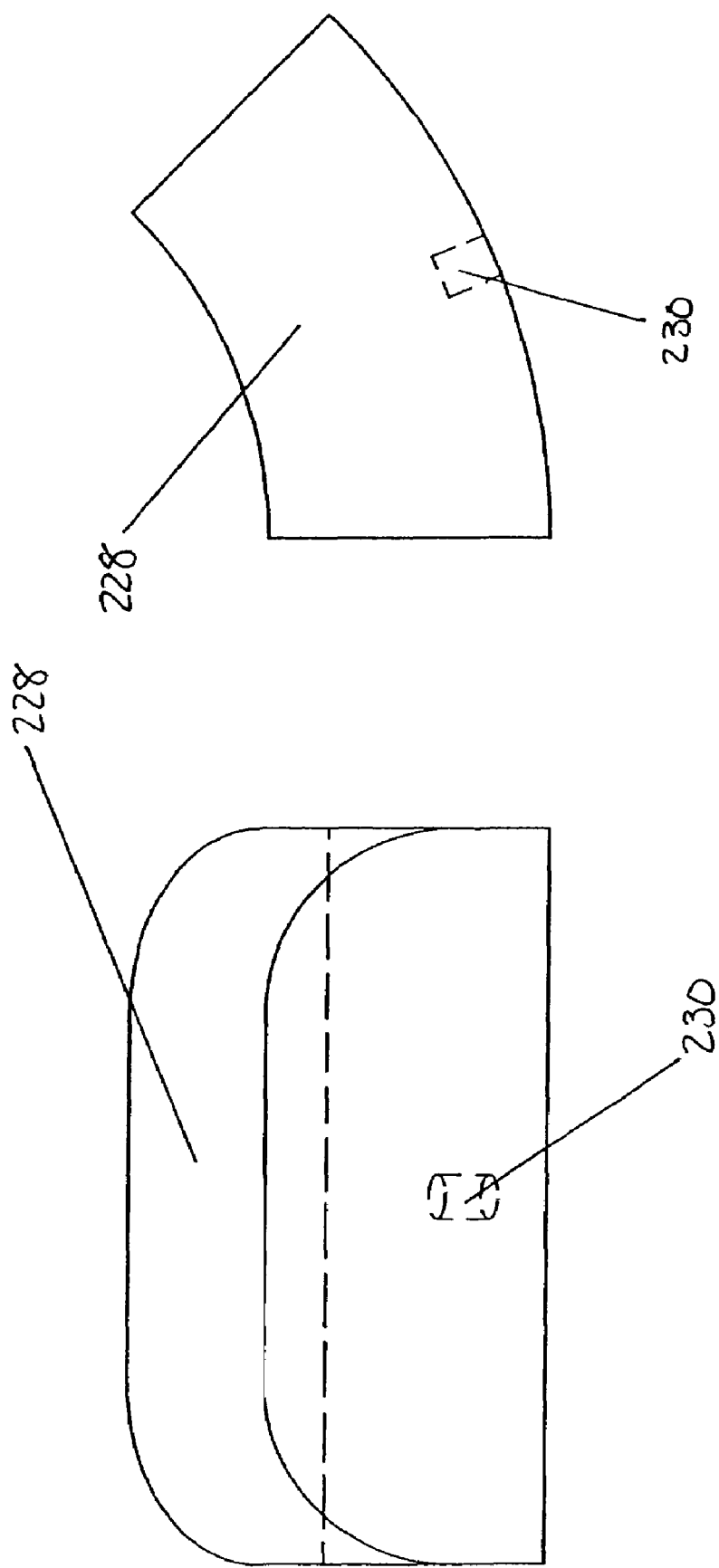
FIG. 15A is a top view of an arch lock segment of a generator assembly according to an embodiment of the present invention.
FIG. 15B is a side view of an arch lock segment of a generator assembly according to an embodiment of the present invention.

Referring now to the particular embodiments of FIGS. 9A and 9B, the design of the exciters 122 in the generator assembly according to an embodiment of the present invention is shown. As used herein, an exciter is defined as a conductive core with wire guides and a lead wire that is coupled to the conductive core on the top and on the bottom such that the conductive core is part of the electron path during current generation. Each exciter 122 comprises a conductive core 134, wire guides 136, and a lead wire 138 that is coupled to the conductive core 134 on the top and on the bottom of each exciter 122, where the conductive core 134 is an integral part of the electron path during current generation. Simplified manipulation of voltage potential is achieved in particular embodiments of the generator assembly 100 of the present invention by varying the exciter layer thickness and separation distances and by utilizing standard conductive material (low resistance), semiconductive material (variable resistance), and superconductive material (no resistance). Preferred embodiments include ambient and cryogenic environments, where ambient temperature embodiments include differentiated current controlled devices.

In one embodiment, the exciters 122 comprise alternating layers of a superconductive material and a non-superconductive material. For example, relatively thin layers, on the order of 1 to 5 microns, of yttrium barium copper oxide, $YBa_2Cu_3O_{7-x}$ (hereinafter YBCO), or another superconductive material may be alternated with relatively thick layers of a standard conductor. The standard conductor material may comprise copper, silver, gold, nickel, tungsten, or another suitable conductive alloy or material known to those of skill in the art. Alternate high temperature superconductors that may be used include $Ba_{0.6}K_{0.4}BiO_3$, $Bi_xSr_{3-x}Ca_xCu_2O_{8+y}$, $Tl_2Ba_2CaCu_2O_8$, $Cs_3C_{60}$, $RbTl_xC_{60}$, and other suitable superconductive materials known to those of skill in the art.

Figure 4:
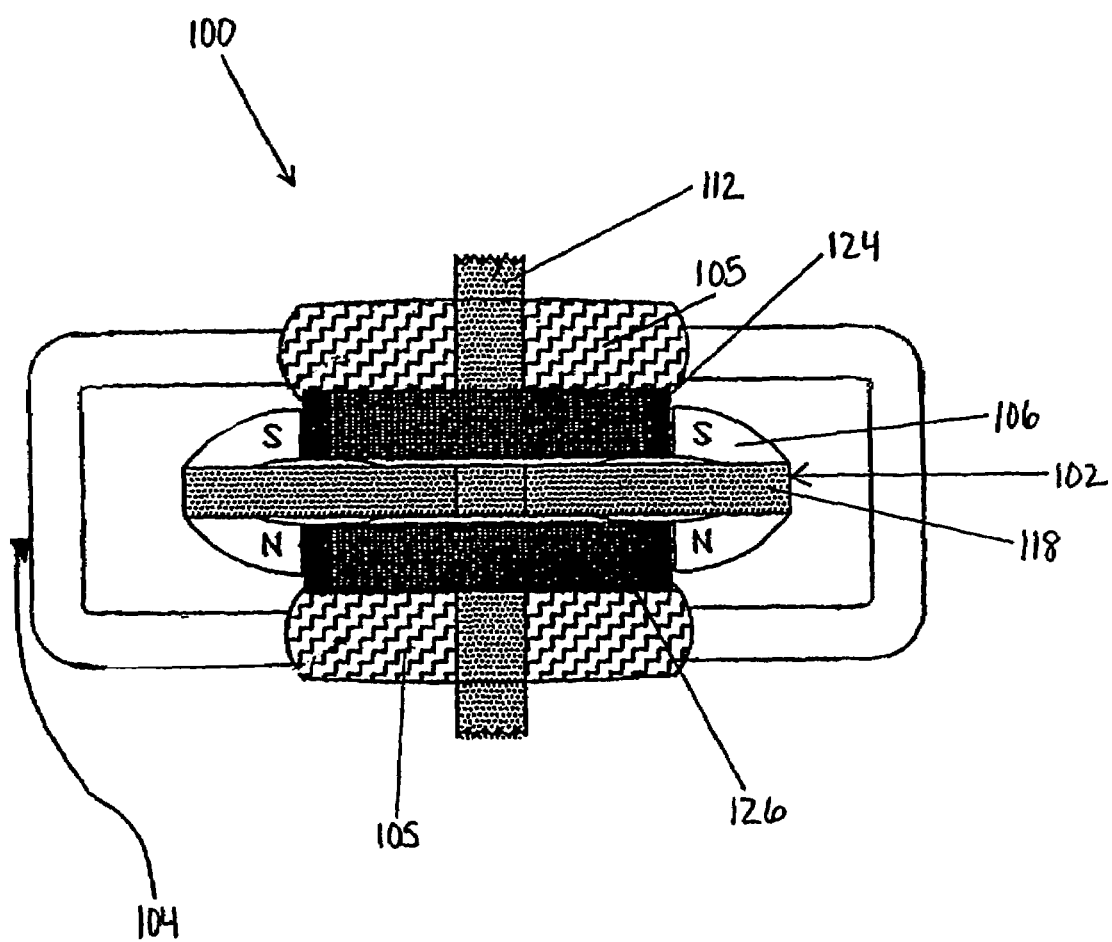
FIG. 4 is a cross-sectional view of a generator assembly according to an embodiment of the present invention.

To increase efficiency and protect the superconductive material, including protecting it from transitioning to a non-superconductive state, which would occur, for example, if it was to carry a high current density and experience a temperature rise above its transition temperature, a coolant may be used in one embodiment of the generator assembly 100 of the present invention. Referring now to FIG. 4, a coolant 105, preferably liquid nitrogen for exciters 122 comprising layers of YBCO, is housed in the mainframe 104 surrounding the permanent magnet subassembly 102 and the rings of exciters 124 and 126 and is insulated from the electrical portions of the generator assembly 100 by glass (not shown). When cooled by liquid nitrogen to the critical temperature, zero Ohm resistance and increased electron concentrations in the YBCO are achieved in this particular embodiment. The Meissner effect increases electron excitation in the standard conductive materials by focusing the magnetic flux in the non-superconductive material. In other embodiments, the coolant 105 may comprise liquid helium or other appropriate materials known to those having skill in the art.

Referring again to FIGS. 9A and 9B, in an alternative embodiment, the exciters 122 may comprise alternating layers of a semiconductive material and a non-semiconductive material. In both superconductive embodiments and semiconductive embodiments, the alternating layers of material are configured parallel to the direction of magnetic field lines in the permanent air gap 110 (see FIG. 2) when the exciter rings 124 and 126 are positioned in the radial air gap 110. Although the magnetic field is focused away from propagating through the superconductive layers because of the Meissner Effect, the magnetic field is able to propagate through the non-superconductive or non-semiconductive layers, resulting in increased excitation in these layers. As the width of each exciter 122 is reduced and the air gap between each exciter is thereby increased, magneto motive force (MMF) is reduced proportionately, which in turn reduces the required mechanical torque input at the drive shaft 112. Low current exciters 122 not only reduce MMF, but also potential hysteresis, or heat losses, in the superconductive material. Further, superconductive material provides a reduced resistance to the induction of current in the exciter conductive core 134. In an AC configuration, as the number of phases of AC output increases from a single phase to 120 phases, root-mean-square (RMS) power increases from 70% of peak voltage and current to upwards of 99% of peak voltage and current for multi-phasic generator-to-motor couplings, increasing the efficiency of the power output in particular embodiments of the generator assembly 100 of the present invention.

The layers may alternatively be arranged tangential to the direction of the magnetic field lines with the surfaces placed in any of the three axis. In embodiments utilizing superconductive material, the superconductive layers tangential to the magnetic field preferably include gateways or breaks to prevent trapped field inefficiencies.

In addition to being reduced by exciter 122 width, in one embodiment MMF is also reduced by moving the exciters 122 laterally out of the area encompassed by the magnetic fields. The power output of the generator may be adjusted by increasing or decreasing the volume of exciter 122 exposed to the stationary or propagating magnetic fields.

The generator assembly 100 of the present invention is preferably brushless, reducing generator components that will wear out and require replacement. A brushless generator assembly 100 also reduces mechanical friction losses, improving efficiency. Carbon brushes may be used in voltage controlled device embodiments, however, without departing from the scope of the present invention.

In one embodiment, the conductive core 134 of each exciter 122 is treated with a non-conductive coating. A lead wire 138 is coupled to the bottom of each exciter 122 and may be helically wound around the conductive core 134 through wire guides 136 such that both ends of each lead wire 138 are accessible from the same side of the exciter 122, or from the same side of the ring-shaped air gap. In other embodiments, the lead wire 138 may be straight or may be a small bus bar. In AC operation, the angle of the helical winding, angle 140, affects the phase of the induced current. In one embodiment, angle 140 is forty-five degrees, although the angles of the helical winding in each of the exciters 122 may be set such that the AC current induced by each of the exciters 122 is in phase and additive, or out of phase, to increase RMS power. Further, the angle 140 of the helical winding may assist phase matching with additional phase matching equipment including other wire windings, transformers, varistors, field effect transistors, and other solid state devices or switch gear.

In operation, the mainframe 104 and the exciter rings 124 and 126 remain stationary relative to the rotating permanent magnet subassembly 102 and drive shaft 112. The permanent magnet subassembly 102 may rotate in a clockwise direction or in a counter-clockwise direction, powered by a motive means, such as a combustion engine or other source, including power take off direct or hydraulic, propane or natural gas, steam, or wind. As the permanent magnets 106 and 108 rotate relative to the exciter rings 124 and 126, a magnetic field is induced in the air gap 110 in which the exciter rings reside. The exciters 122 of rings 106 and 108 cut through the magnetic field lines and current is induced in each exciter 122. The tangential movement of the exciters 122 with respect to the magnetic field lines denotes maximum output, where the tangential movement occurs more often than in standard sinusoidal synthesis, producing a modified or hybrid sinusoidal pattern in one embodiment. The current flows through each exciter 122 and lead wire 138 and is supplied to a load, which could be a motor, utility, or other end user or electric energy consumer. In another embodiment, the exciter rings 124 and 126 may rotate while the permanent magnet subassembly 102 remains stationary.

Referring now to the embodiments illustrated in FIGS. 10-14, the generator assembly 200 comprises a permanent magnet subassembly 202 and an exciter subassembly 222. The permanent magnet subassembly 202 further comprises a segmented C-shaped circular-width primary external magnet 204 that defines an air gap 206, a secondary internal magnet 208, an inner locking wedge 210 with adjustable wedge collars (not shown), an outer locking wedge 212, a drive shaft 214, an adjustable retaining collar 216, and a housing. The permanent magnet subassembly 202 is coupled to the drive shaft 214 and held in place relative to the drive shaft 214 by an adjustable retaining collar 216.

The exciter subassembly 222 comprises a ring of exciters 218 and a plurality of lead wires 224 associated with each exciter 220, as shown and described in detail above in FIGS. 9A and 9B. The ring of exciters 218 comprises multiple individual exciters 220. In one embodiment, ninety single-channel exciters 220 are configured side by side in a 360-degree ring 218, with a separation between each exciter 220. In this embodiment, each of the exciters 220 occupies about three degrees of the ring 218 and each separation between exciters 220 is about one degree, forming a complete 360-degree ring 218. In an alternative embodiment, the ring 218 comprises 120 exciters 220 configured side by side in a 360-degree ring 218. In this embodiment, each exciter 220 occupies about two degrees of the 360-degree ring 218, with a separation of about one degree between each exciter 220.

The C-shaped circular-width primary external magnet 204 comprises a plurality of segments. In one embodiment, the external magnet 204 comprises eight segments 204a-h. In alternative embodiments, a greater number of segments may be used, but leakage will increase and generator efficiency will decrease as the segments become smaller. Increasing the diameter and thus the circumference of the external magnet 204, however, will move the air gap 206 to the outer diameter of the external magnet 204, reducing leakage while preserving the number of pole alterations available in a single revolution. Further, as the diameter of the magnet 204 increases, the thickness of the magnet 204 may be decreased. In one embodiment, thin elongated fan-blade magnets may be used in a magnet assembly 202 with a large diameter.

The generator assembly 200 of the present invention may produce multiple output types depending upon the configuration of the segments 204a-h of the external magnet 204, speed, and size or scale. For example, the generator assembly 200 may produce DC at variable input speeds, or AC at various frequencies and speeds. In one preferred embodiment, the generator assembly 200 may produce AC at 3600 RPM, where the magnetic poles of each segment 204a-h alternate north-south-north-south. In other configurations, the generator assembly 200 may produce AC at 1800 RPM, AC at 900 RPM, or DC, depending upon the configuration of the segments 204a-h, diameter of the magnets 204, or speed of rotation. For example, to produce DC, the segments 204a-h are assembled with matched poles, such that the current induced in each exciter 220 is in the same direction for the entire 360 degrees of rotation of the permanent magnet subassembly 202. Thus, particular embodiments of the generator assembly 200 of the present invention are easily reconfigurable, requiring only a rearrangement of existing parts to produce various desired outputs.

Referring now to FIGS. 15A and 15B, the segmented housing 228 that encloses the magnet assembly 202 is preferably aluminum or an alternate lightweight material and includes a plurality of teeth 230 equally spaced around the interior surface of the housing 228 where the housing 228 abuts the magnet 204. The teeth 230 interlock with appropriately spaced notches on the exterior of each segment of the magnet 204 to hold the external magnet 204 in place relative to the housing 228.

In operation, the exciter subassembly 222 and exciter ring 218 remain stationary relative to the rotating permanent magnet subassembly 202 and drive shaft 214. The permanent magnet subassembly 202 may rotate in a clockwise direction or in a counterclockwise direction, powered by a motive means, such as a combustion engine, power take off direct or hydraulic, propane or natural gas, steam, wind, or other source. As the permanent magnets 204 and 208 rotate relative to the exciter ring 218, a magnetic field is induced in the air gap 206 in which the exciter ring 218 resides. The exciter ring 218 cuts through the magnetic field lines and current is induced in each exciter 220. The current flows through each exciter 220 and lead wire 224 and is supplied to a load, which may be a motor, a utility, an end user, or some other electric energy consumer. In another embodiment, the exciter ring 218 may rotate while the permanent magnet subassembly 202 remains stationary.

Figure 16:
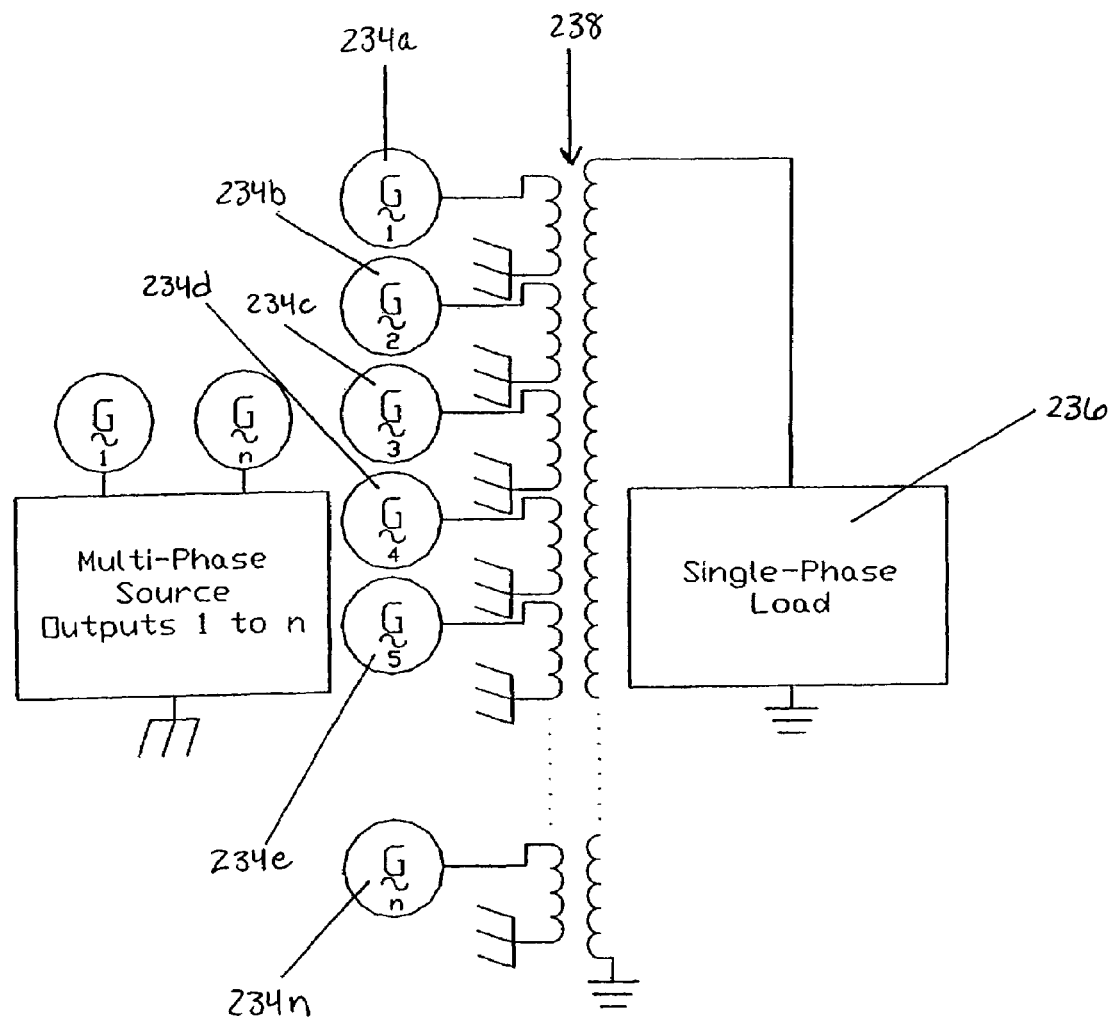
FIG. 16 is a schematic of a generator assembly application according to an embodiment of the present invention.
Figure 17:
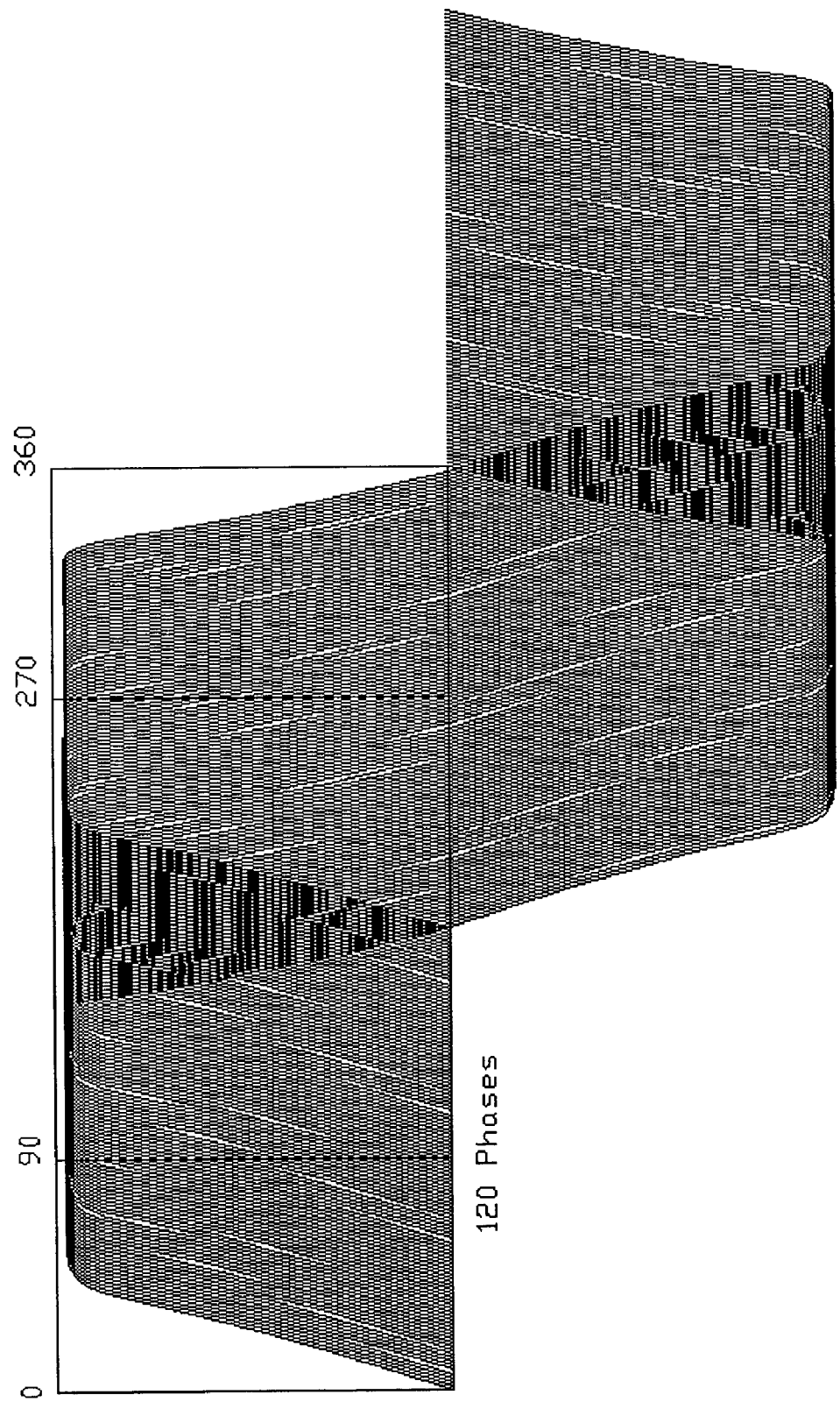
FIG. 17 is a phase diagram of a generator assembly according to an embodiment of the present invention.

Referring now to FIGS. 16 and 17, the generator of the present invention may be used to produce from 1 to 120 AC phases, where a distinct phase is produced by each exciter 234a-n. As the number of phases increase, RMS voltage and current each see a proportionate increase toward peak voltage and current levels. RMS power thus becomes increasingly efficient, with multi-phasic efficiency savings upwards of 99% efficient in particular embodiments. The generator supplies a single-phase load 236 with AC through a winding transformer 238. In a DC mode, no transformer 238 is used. Instead, a bank of capacitors stores DC and distributes it with switches. Particular embodiments of the generator of the present invention may be easily scaled in size to accommodate a particular application and are also capable of operating modularly, where multiple generators may run on a single spindle to produce multiple outputs.

In operation, the generator of the present invention is primarily a current producing device, although it may alternatively operate as a voltage producing, or current or voltage controlled, device in other embodiments. Particular embodiments of the generator apparatus of the present invention may produce either AC or DC by mechanical means, and power regulation may be accomplished by moving the exciter and housing or the ground assembly laterally out of the area encompassed by the magnetic fields in the air gap or gaps. As a current producing device, the generator may operably produce either an AC or DC output. The permanent magnets of particular embodiments of either the C-shaped permanent magnet subassembly or the U-shaped permanent magnet subassembly are arranged in one of several configurations as described in more detail above prior to operating the generator, such that the desired output will be produced. Thus, in one embodiment, retooling is reduced or eliminated and no additional parts are required to alter the type of output produced by the generator, providing a more cost-effective and versatile generator design with improved manufacturability. The generator identifies AC or DC production by magnetic mechanical means and regulation of power output by exciter mechanical means, where in one embodiment the regulation is controlled by a microprocessor and solid state switching and power distribution devices and assemblies. In one embodiment, a hydraulic apparatus allows quick and agile adjustment of power output by increasing or decreasing the volume and surface area of exciter exposed to the stationary or propagating magnetic fields.

In various preferred embodiments, simplified manipulation of voltage potential is achieved by varying the exciter layer thickness and separation distances and by utilizing standard conductive material (low resistance), semiconductive material (variable resistance), and superconductive material (no resistance). Further, efficiency of particular embodiments may be improved by the use of a superconductive material in the exciters. When cooled by liquid nitrogen to the critical temperature, particular embodiments of the generator apparatus of the present invention achieve zero Ohm resistance and increased electron concentrations in the YBCO of the exciters. The Meissner effect increases electron excitation in the standard conductive materials by focusing the magnetic flux in the non-superconductive material. In operation, particular embodiments of the generator of the present invention require less torque at the input because of the improved exciter design. As described above, the exciters may comprise a plurality of thin pieces rather than a single solid piece or larger solid pieces in a preferred embodiment, where increasing the degree of the air gap, or mechanically removing the exciters from the air gap, proportionally reduces MMF. In particular embodiments of the generator apparatus of the present invention, using thin superconductive layers in the exciters allows for current to be induced in the exciter core with reduced or zero Ohm resistance, a superconductive material characteristic that allows for an increased concentration of electrons in the exciters. Additionally, as RMS power approaches peak power, efficiency levels upwards of 99% may be realized in multi-phasic applications of particular embodiments of the generator apparatus of the present invention.

Although the present invention has been described with reference to particular embodiments, one skilled in the art will recognize that changes may be made in form and detail without departing from the spirit and the scope of the invention. Therefore, the illustrated embodiments should be considered in all respects as illustrative and not restrictive.

What is claimed is:

1. A permanent magnet generator comprising:
   an exciter mainframe comprising at least one exciter element; and
   a permanent magnet subassembly comprising a plurality of magnets that are arranged to form at least one air gap between facing magnetic poles in which the at least one exciter resides, the plurality of magnets comprising a first toroidal magnet of the plurality of magnets having a first magnetic pole and a second magnetic pole, and a second toroidal magnet of the plurality of magnets having a first magnetic pole and a second magnetic pole, the first and second magnetic poles of the second magnet facing the magnetic poles of the first magnet;
   wherein the plurality of magnets are reconfigurable for alternating current operation wherein the magnetic poles of the first magnet are opposite in polarity to the magnetic poles of the second magnet to induce current in a first direction for a first 180 degrees and in a second opposite for the other 180 degrees of a 360 degree rotation of the permanent magnet subassembly, or direct current operation wherein the magnetic poles of the first magnet are matched in polarity to the magnetic poles of the second magnet to induce current in a single direction for the entire 360 degrees of rotation of the permanent magnet subassembly.

2. The permanent magnet generator of claim 1, wherein the first magnetic pole of the first magnet and the first magnetic pole of the second magnet face to form a first air gap in which a first at least one exciter element resides, and wherein the second magnetic pole of the first magnet and the second magnetic pole of the second magnet face to form a second air gap in which a second at least one exciter element resides.

3. The permanent magnet generator of claim 1, wherein the at least one exciter mainframe comprises at least 90 exciter elements configured side by side in a 360-degree ring with a uniform separation between each exciter element.

4. The permanent magnet generator of claim 1, wherein the at least one exciter mainframe comprises at least 120 exciter elements configured side by side in a 360-degree ring with a uniform separation between each exciter element.

5. The permanent magnet generator of claim 2, wherein the first magnet comprises at least a first segment and a second segment, and wherein the second magnet comprises at least a first segment and a second segment.

6. The permanent magnet generator of claim 1, wherein each of the plurality of magnets comprises a plurality of reconfigurable magnet segments.

7. The permanent magnet generator of claim 5, wherein:
   the first magnetic pole of the first magnet and the second magnetic pole of the second magnet are of a first polarity;

the second magnetic pole of the first magnet and the first magnetic pole of the second magnet are of a second polarity, wherein the second polarity is opposite the first polarity such that the facing magnetic poles have opposite polarities; and the at least first and second opposing segments of each the first magnet and the second magnet have matched abutting magnetic poles such that the permanent magnet generator operably produces a direct current output.

8. The permanent magnet generator of claim 5, wherein:

the first magnetic pole of the first magnet and the second magnetic pole of the second magnet are of a first polarity; and the second magnetic pole of the first magnet and the first magnetic pole of the second magnets are of a second polarity, wherein the second polarity is opposite the first polarity such that the facing magnetic poles have opposite polarities; and wherein the at least first and second segments of each the first magnet and the second magnet have inverse abutting magnetic poles such that the permanent magnet generator operably produces an alternating current output.

9. The permanent magnet generator of claim 1, wherein the at least one exciter element further comprises:

a conductive core;

a helical lead wire; and a plurality of alternating layers of a first material and a second material.

10. The permanent magnet generator of claim 9, wherein the first material comprises a superconductive material and the second material comprises a non-superconductive material, and wherein the layers of the superconductive material are thin relative to the thickness of the layers of the non-superconductive material.

11. The permanent magnet generator of claim 10, wherein the exciter mainframe further comprises a coolant enclosure, wherein the coolant enclosure operably communicates with the exciter mainframe to communicate a coolant to at least one exciter element, and wherein the coolant enclosure encloses a coolant.

12. The permanent magnet generator of claim 1, wherein the permanent magnet subassembly further comprises:

an external magnet comprising a first magnetic pole and a second magnetic pole, wherein the first magnetic pole and the second magnetic pole oppose each other to form the air gap in which the at least one exciter element resides; and a secondary internal magnet.

13. The permanent magnet generator of claim 12, wherein the first magnet is chosen from a set consisting of: a unitary magnet, a two segment magnet assembly, a four segment magnet assembly, or an eight segment magnet assembly.

14. The permanent magnet generator of claim 13, wherein each segment has a first magnetic pole of a first polarity and a second magnetic pole of a second polarity, and wherein the first polarity is comparatively opposite the second polarity, and wherein the first magnetic pole of each segment is adjacent to the second magnetic pole of an abutting segment, and wherein the permanent magnet generator operably produces alternating current.

15. The permanent magnet generator of claim 13, wherein each segment has a first magnetic pole of a first polarity and a second magnetic pole of a second polarity, and wherein the first polarity is comparatively opposite the second polarity, and wherein the first magnetic pole of each adjacent segment is uniform to the first magnetic pole of an adjacent segment, and wherein the permanent magnet generator operably produces direct current.

16. The permanent magnet generator of claim 12, further comprising a housing, wherein the housing further comprises a plurality of teeth disposed on an interior circumferential surface of the housing, and wherein the plurality of teeth engage a plurality of notches disposed on an exterior circumferential surface of the external magnet to operably hold the external magnet in place relative to the housing.

17. A permanent magnet generator comprising:

a permanent magnet subassembly comprising a first toroidal magnet and a second toroidal magnet arranged to form at least one air gap between facing magnetic poles of the first and the second magnets, wherein the plurality of magnets are reconfigurable for alternating current operation wherein the magnetic poles of the first magnet are opposite in polarity to the magnetic poles of the second magnet to induce current in a first direction for a first 180 degrees and in a second opposite for the other 180 degrees of a 360 degree rotation of the permanent magnet subassembly, or direct current operation wherein the magnetic poles of the first magnet are uniform in polarity to the magnetic poles of the second magnet to induce current in a single direction for the entire 360 degrees of rotation of the permanent magnet subassembly; and an exciter mainframe subassembly comprising at least one exciter element residing in the at least one air gap.

18. The permanent magnet generator of claim 17, wherein the first magnet and the second magnet each comprise a plurality of reconfigurable magnet segments.

19. The permanent magnet generator of claim 17, wherein the first magnet comprises a first inward-facing magnetic pole and a second inward-facing magnetic pole, wherein the second magnet comprises a first outward-facing magnetic pole and a second outward-facing magnetic pole, wherein the first magnetic poles form a first air gap and the second magnetic poles form a second air gap, and wherein a first at least one exciter element resides in the first air gap and a second at least one exciter element resides in the second air gap.

20. The permanent magnet generator of claim 17, wherein the at least one exciter element comprises alternating layers of a superconductive material and a non-superconductive material.

21. The permanent magnet generator of claim 17, wherein the first magnet comprises an external magnet having a first magnetic pole and a second magnetic pole opposed to form the at least one air gap, wherein the second magnet comprises an internal magnet, and wherein the at least one exciter element resides in the air gap.

22. The permanent magnet generator of claim 21, wherein the at least one exciter element comprises alternating layers of a superconductive material and a non-superconductive material.

23. A permanent magnet generator comprising:

an exciter mainframe;

a first at least one exciter element coupled to the exciter mainframe and residing in a first air gap, the first at least one exciter element coupled to at least one short helical lead wire;

a second at least one exciter element coupled to the exciter mainframe and residing in a second air gap, the second at least one exciter element coupled to at least one short helical lead wire;

a first reconfigurable magnet;

a second reconfigurable magnet;
a connecting arm coupled to the first reconfigurable magnet and the second reconfigurable magnet; and
a drive shaft coupled to the connecting arm; and
wherein the first reconfigurable magnet includes a first magnet having a first magnetic pole and a second magnetic pole, and the second reconfigurable magnet includes a first magnetic pole and a second magnetic pole, the first and second magnetic poles of the first magnet facing the magnetic poles of the first reconfigurable magnet.

24. A permanent magnet generator comprising:
a mainframe;
a first at least one exciter coupled to the mainframe and residing in a first air gap, the first at least one exciter coupled to at least one lead wire;
a second at least one exciter coupled to the mainframe and residing in a second air gap, the second at least one exciter coupled to at least one lead wire;
a first reconfigurable magnet;
a second reconfigurable magnet;
a connecting arm coupled to the first reconfigurable magnet and the second reconfigurable magnet; and
a drive shaft coupled to the connecting arm;
wherein the at least one exciter comprises alternating layers of a superconductive material and a non-superconductive material.

25. The permanent magnet generator of claim 23, wherein the first reconfigurable magnet and the second reconfigurable magnet each comprise a plurality of reconfigurable magnet segments.

26. A permanent magnet generator comprising:
a housing;
a drive shaft;
a reconfigurable external magnet coupled to the drive shaft and enclosed by the housing;
an internal magnet coupled to the drive shaft; and
at least one exciter element residing in an air gap defined by the external magnet, the at least one exciter element coupled to at least one short helical lead wire.

27. A permanent magnet generator comprising:
a housing;
a drive shaft;
a reconfigurable external magnet coupled to the drive shaft and enclosed by the housing;
an internal magnet coupled to the drive shaft; and
at least one exciter residing in an air gap defined by the external magnet, the at least one exciter element coupled to at least one lead wire;
wherein the at least one exciter comprises alternating layers of a superconductive material and a non-superconductive material.

28. The permanent magnet generator of claim 26, wherein the reconfigurable external magnet comprises a plurality of reconfigurable magnet segments.

29. An exciter configuration of a permanent magnet generator wherein the exciter configuration comprises:
an exciter mainframe;
at least one exciter element coupled to the mainframe; and
at least one short helical lead wire, the at least one short helical lead wire coupled to the at least one exciter element.

30. The exciter configuration of claim 29, wherein the at least one exciter mainframe comprises at least 90 exciter elements.

31. The exciter configuration of claim 29, wherein the at least one exciter mainframe comprises at least 120 exciter elements.

32. The exciter configuration of claim 29, wherein the at least one exciter further comprises a plurality of alternating layers of a first material and a second material, wherein the layers of the first material are thin relative to the layers of the second material.

33. An exciter configuration of a permanent magnet generator wherein the exciter configuration comprises:
a frame;
at least one exciter coupled to the frame; and
at least one lead wire, the at least one lead wire coupled to the at least one exciter;
wherein the at least one exciter further comprises a plurality of alternating layers of a first material and a second material, wherein the layers of the first material are thin relative to the layers of the second material; and
wherein the first material comprises a superconductive material and the second material comprises a non-superconductive material.

34. A method for generating electric energy using a reconfigurable permanent magnet generator comprising:
selecting an alternating current or a direct current generation mode;
configuring at least one reconfigurable magnet to correspond with the selected generation mode;
disposing at least one exciter in an air gap defined by the at least one reconfigurable magnet; and
rotating the at least one reconfigurable magnet relative to the at least one exciter;
wherein the reconfigurable permanent magnet generator comprises a plurality of magnets that are arranged to form at least one air gap between facing magnetic poles in which the at least one exciter resides, the plurality of magnets comprising a first toroidal magnet of the plurality of magnets having a first magnetic pole and a second magnetic pole, the first and second magnetic poles of the first magnet facing inwardly, and a second toroidal magnet of the plurality of magnets having a first magnetic pole and a second magnetic pole, the first and second magnetic poles of the second magnet facing outwardly toward the inward-facing magnetic poles of the first magnet, and wherein selecting an alternating current or a direct current generation mode comprises:
arranging the magnetic poles of the first magnet opposite in polarity to the magnetic poles of the second magnet to induce current in a first direction for a first 180 degrees and in a second opposite for the other 180 degrees of a 360 degree rotation of the permanent magnet generator for alternating current operation, and arranging the magnetic poles of the first magnet are matched in polarity to the magnetic poles of the second magnet to uniformly induce current in a single direction for the entire 360 degrees of rotation of the permanent magnet generator for direct current operation.

35. The method of claim 34 further comprising:
mounting a plurality of reconfigurable permanent magnet generators on a single spindle; and
generating a plurality of electric energy outputs.

36. A permanent magnet generator comprising:
permanent magnet means defining at least one air gap, the permanent magnet means reconfigurable for alternating current or direct current generation;

exciter means residing in the at least one air gap for conducting induced current; and drive means for rotating the permanent magnet means relative to the exciter means to induce current flow in the exciter means and generate electric energy.

37. The permanent magnet generator of claim 36, wherein the permanent magnet means comprise at least a first reconfigurable magnet and a second reconfigurable magnet.

38. The permanent magnet generator of claim 37, wherein the first reconfigurable magnet and the second reconfigurable magnet each comprise a plurality of reconfigurable magnet segments.

39. The permanent magnet generator of claim 2, wherein the first magnet is chosen from a set consisting of: a unitary magnet, a two segment magnet assembly, a four segment magnet assembly, or an eight segment magnet assembly.

* * * * *